May 3, 1966 B. L. KOFF 3,249,293
RING-DRUM ROTOR
Filed Jan. 23, 1964 2 Sheets-Sheet 1
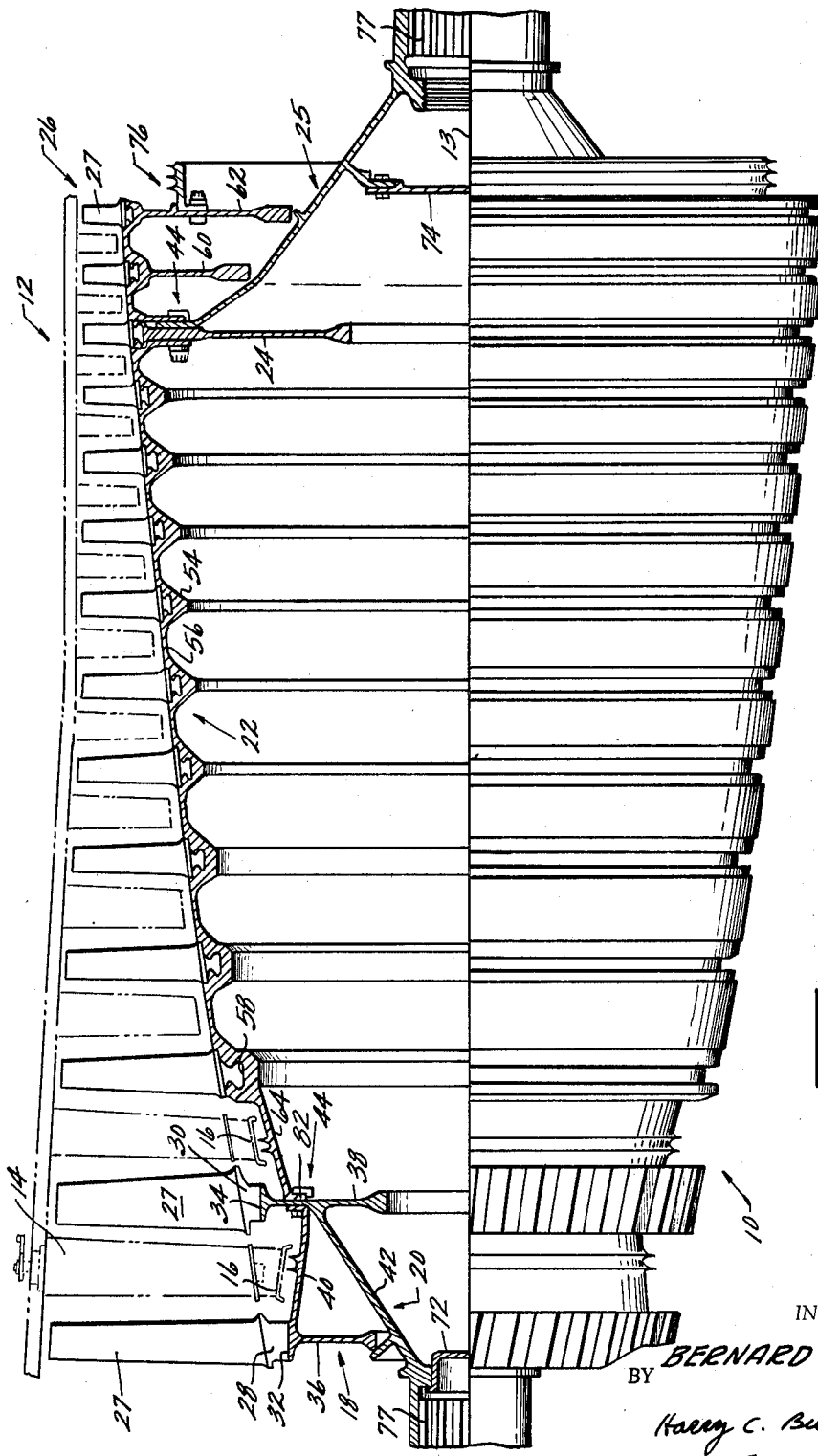
INVENTOR.
BERNARD L. KOFF
BY
Harry C. Burgess
ATTORNEY May 3, 1966 B. L. KOFF 3,249,293
RING-DRUM ROTOR
Filed Jan. 23, 1964 2 Sheets-Sheet 2
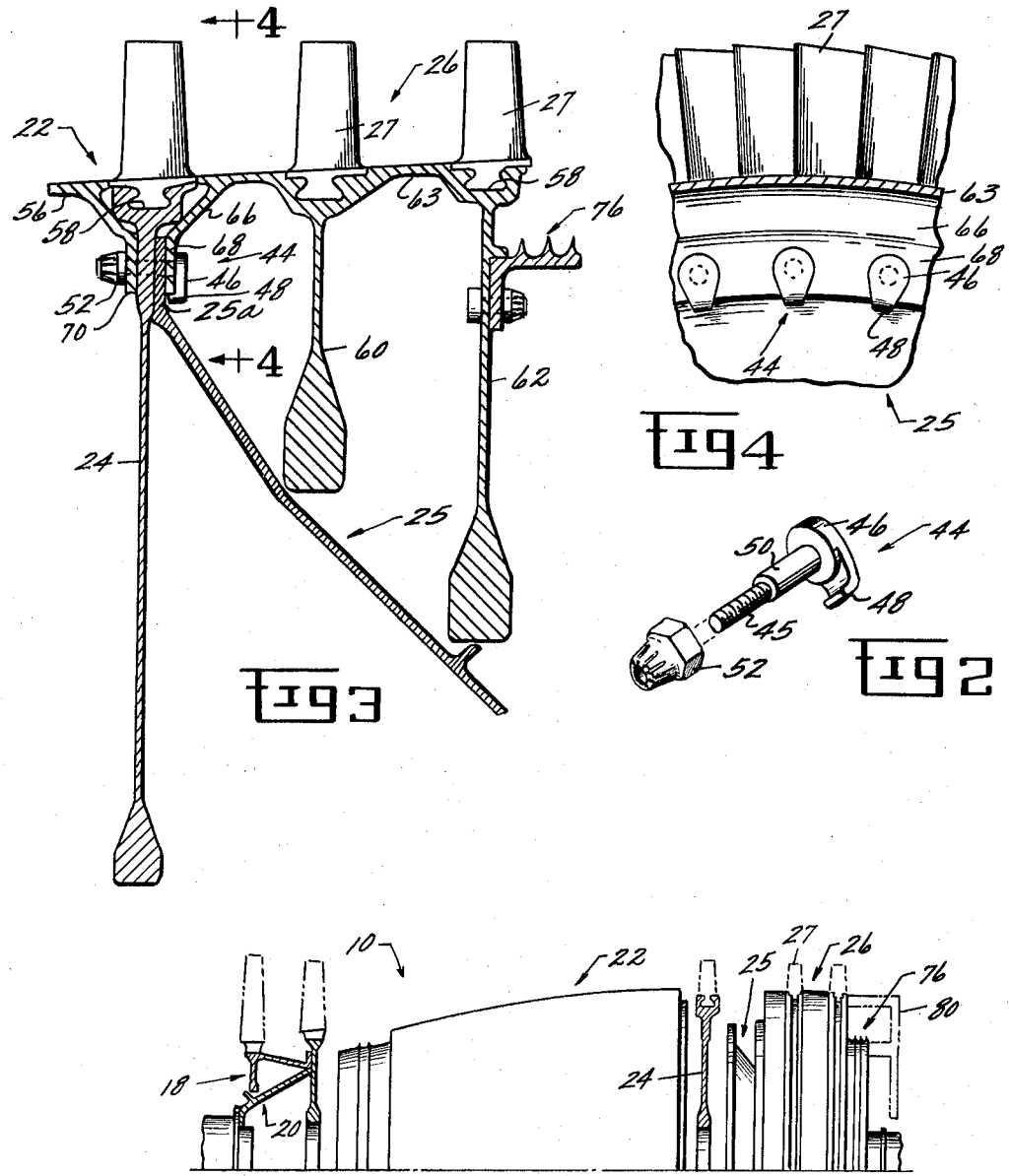
INVENTOR.
BERNARD L. KOFF
BY
Harry C. Burgess
ATTORNEY United States Patent Office 3,249,293
Patented May 3, 1966

3,249,293
RING-DRUM ROTOR
Bernard L. Koff, Cincinnati, Ohio, assignor to General
Electric Company, a corporation of New York
Filed Jan. 23, 1964, Ser. No. 339,667
3 Claims. (Cl. 230—134)

This invention relates to an improvement in bladed rotor construction and, more specifically, to means for improving the construction of multi-stage, axial-flow, compressor rotors, for example, for use in high speed, lightweight, aircraft type gas turbine engines.

It has been learned that for high speed, high pressure ratio, lightweight, aircraft type gas turbines a superior multi-stage, axial-flow rotor (e.g. compressor) construction is one utilizing an integral, or fabricated generally cylindrical spool member, sometimes called a "drum," for the primary structural and blade supporting portion of the rotor. One of the advantages of the known drum-type rotor constructions is the capability of quick and easy rotor blade replacement, i.e., blades may be individually removed without partial or complete disassembly of the spool of drum structure through use of circumferential dovetail (blade root) grooves. Another advantage is the increased mechanical integrity and aerodynamic performance capability of the "smooth spool" drum-type rotor configuration. In this type of construction spacer members are positioned between adjacent disk members and attached to the rims thereof to form an essentially continuous drum surface or inner flow path boundary wall of equal or, more conventionally, gradually increasing diameter throughout the rotor from front to rear. This arrangement enables substantially all of the stator vane rows (beyond the first, and possibly the second stage, which are joined at the tips thereof to present increased resistance to foreign object damage) of a multi-stage axial-flow compressor to be unshrouded, i.e., unsupported at the tips or radially inner ends of the vanes.

While advantageous for these, and other reasons, the conventional drum-type rotor construction has certain distinct disadvantages when applied to high speed, lightweight, aircraft type gas turbines. For example, the drum type rotor of Patent 2,931,625 assigned to the present assignee, while embodying the desirable easy blade removal feature, nevertheless incorporates the typical prior art integral spacer-disk construction unsuitable for optimum lightweight engine designs. In this design the disks are, in effect, structural reinforcing webs for the drum cylinder which arrangement not only inherently increases the weight of the drum but also prevents internal assembly of the drum to the rotor shaft(s). Another example of the "smooth-spool" drum type rotor configuration is that shown in Patent 2,869,439 wherein a plurality of relatively heavy intermediate disks are bolted to separate heavy spacer members to form a rigid drum. Again, this type of construction lacks simplicity and, moreover, requires a multiplicity of undesirable difficult, costly and time-consuming assembly operations. Examples of the *non*-smooth-spool type drum rotor configurations includes Patents 2,868,439 and 3,051,436. In the former reference, an integral fibre-like glass drum-like hub is provided requiring a plurality of reinforcing disks, and in the latter patent the blades are pinned to disk stubs projecting from a relatively heavy drum-hub structure. On the other hand, the extremely lightweight, relatively flimsy permanently fabricated sheet metal structures that have heretofore been suggested for use in gas turbine engine drum-type rotor construction (see, for example, Patent 3,067,928) have left much to be desired in the areas of ease of blade replacement, reliability, structural integrity (e.g., internal pressurization may be required to provide needed stiffness) and power capability.

In short, conventional drum-type rotor constructions having either the aforementioned relatively heavy complicated configuration requiring complex, costly and time-consuming assembly operations or the fully fabricated sheet metal drum having permanently attached (e.g., welded or brazed) blades, are both deemed unsuitable for engine applications embodying relatively high rotor blade tip speeds and high pressure ratios and wherein ease of assembly and individual rotor blade replacement are either necessary or highly desirable features while, at the same time, there is a definite requirement that weight be at a minimum *consistent* with reliability and safety of operation. Such an application is exemplified in the advanced engines being designed for today's supersonic aircraft.

Accordingly, the primary object of the present invention is to provide an improved multi-stage, axial-flow, bladed rotor construction, in particular, a smooth-spool drum-type compressor rotor, for use in advanced, lightweight, gas turbine engines for supersonic aircraft.

A more specific object of the present invention is the provision of an improved smooth-spool, drum-type multi-stage, high pressure ratio, axial-flow rotor of relatively lightweight construction featuring individual blade removal and the fewest number of major parts, consistent with design integrity, wherein such parts are arranged in specified "groups" in a manner greatly simplifying assembly operations.

Briefly stated, in a disclosed embodiment of my invention, a bladed rotor assembly includes a frusto-conical hollow "ring-drum" piece consisting essentially of a thin shell portion containing a plurality of axially-spaced circumferential dovetail grooves in its outer surface adapted to retain the rotor blades. Inside the shell and aligned axially with each groove are a plurality of narrow rings of a truncated triangular shape, in cross-section, the rings being integral with the shell and extending radially inward. The "ring-drum" piece internal diameter at the rings is only very slightly smaller than the shell outer diameter, i.e., the conventional disk-webs are eliminated. A forward rotor-blade supporting member is provided consisting of a front stub shaft having at least one rigidizing disk portion integral therewith, the disk portion having an enlarged rim section containing axial blade slots. A rearward rotor-blade supporting sub-assembly, or "group" is provided including a rigidizing disk member, a two-stage disk-drum, and a rear stub shaft. It is a feature of the invention that, excluding the blades, the number of pieces of the assembly is greatly minimized by "grouping" of the major parts, i.e., the rotor stub shafts and the stage (blade) supporting members, to provide an improved drum-type rotor assembly in which at least 80% of the stages of the multi-stage rotor are retained in circumferential dovetail grooves. Optimum use is made of stage material to achieve a lightweight design and greatly simplified assembly procedures through utilization of internally installed fasteners including means permitting pre-assembly of the fasteners with the major structural parts of the rotor.

These and other advantageous features of my invention, although believed apparent from the claims appended hereto, may become better understood by recourse to the following detailed description, including drawings in which:

FIG. 1 is a side view, partially in cross-section, of a compressor rotor embodying the subject invention;

FIG. 2 is a pictorial view of fastening means utilized in assembly of the major rotor parts depicted in the drawings;

FIG. 3 is a fragmentary side view, partially in cross-section, of the aft sub-assembly, or "group" of the rotor construction of FIG. 1;

FIG. 4 is a view along line 4—4 of FIG. 3; and

FIG. 5 is an exploded view illustrating the ease in which the novel rotor configuration of my invention may be assembled.

Turning now more specifically to the drawings, FIG. 1 illustrates a preferred embodiment of the invention incorporated in an axial-flow compressor rotor having a plurality (e.g., 14) of "stages" or rows of airfoils (blades) so arranged as to be individually replaceable without disassembly of the *major structural* parts of the rotor spool which parts have herein been reduced to a minimum number in order to lower cost, reduce weight, and greatly simplify the assembly procedures hereinafter described. With the possible exception of the first two stages, which may include shrouded or tip-supported stator vanes for increased resistance to foreign object damage, the rotor is of the "smooth spool" variety as defined above. Thus, the rotor or spool assembly, indicated generally at 10, is enclosed in a known manner by an outer or stator casing, indicated at 12, and shown in phantom in the drawing. The stator casing will be horizontally split into two 180° sections in a plane coexistent with line 13, if desired, to facilitate assembly. Extending radially inward from the stator casing are a plurality of stator vanes 14 arranged in axially spaced rows, the first two stages, in the disclosed embodiment, including circular stiffening bands or shrouds 16 affixed to the vane tips. It will be noted, however, that the outer shroud diameter is arranged to provide a substantially continuous, i.e., smooth flow path line.

A primary feature of the invention, as stated above, is the minimization of the number of separate major structural parts required to construct the rotor. In keeping with this desirable design objective, I have provided a hollow smooth-spool rotor incorporating in the embodiment depicted in FIG. 1 only *six* (6) major structural parts (exclusive of blades). This is achieved by an improvement over the conventional drum-type rotor construction, utilizing circumferential blade dovetail grooves, by what I have termed "grouping" of specific parts. Thus, by referring to FIG. 1, it will be seen that the rotor or spool 10 consists of: (1) an integral first stage disk (blade supporting member) and spacer, indicated generally at 18; (2) an integral second stage disk and forward conical rotor support or stub shaft, indicated generally at 20; (3) a "ring-drum" piece, indicated generally at 22; (4) a single rigidizing and blade supporting disk, indicated at 24; (5) a rear stub shaft, indicated generally at 25; and (6) a rear disk drum, indicated generally at 26. The rotor 10 includes a plurality of "stages," corresponding in number to those of the stator 12, comprised of axially spaced rows of airfoils or bladed members 27 alternating with the rows of vanes 14, in a known manner. The rotor blades of the first two stages, in this example, have root portions 28–30 adapted to fit in axial grooves 32–34 in the rim areas of the disk portions 36–38 of the integral first stage disk-spacer member 18 and the second stage disk-stub shaft member 20, all respectively. Use of axial grooves in this portion of the rotor is beneficial, in conjunction with the shrouded stator vane stages, to provide the compressor with increased resistance to foreign object damage from articles ingested by the engine.

Describing the major parts of the rotor or spool in more detail, the first stage part 18, in addition to the disk or blade supporting portion 36, also includes an integral spacer portion 40 extending rearwardly to be joined to the disk portion 38 of part 20 at the juncture of the disk and a conical forward stub shaft portion 42 integral therewith. Major rotor parts 18 and 20 are joined with each other and the third major rotor structural member, i.e., the unique "ring-drum" piece 22, by means of self-retaining fasteners, one of which is indicated generally at 44 in FIG. 1, and shown in more detail in FIG. 2.

Turning for a moment to FIG. 2, the fastener 44 comprises a bolt having a threaded portion 45, an enlarged generally circular head portion 46 having a bent or hook portion 48 forming a right angle therewith, and a round portion 50 adapted to pass through smooth holes in parts 18-20-22 placed in alignment during the assembly procedure, described hereinafter in greater detail. Nuts 52 may be used to retain the fasteners or "hook bolts" 44 in the holes.

Referring again to FIG. 1, the "ring-drum" piece, indicated generally at 22, is essentially a relatively thin hollow shell of generally frusto-conical shape, in cross-section, consisting of a plurality of integral narrow "ring" portions 54 of truncated generally triangular shape (in cross-section) joined by integral, very thin "spacer" portions 56. The "ring" portions, it will be noted, are in axial alignment with circumferential blade grooves 58 of the so-called dovetail variety located in the shell outer surface. The ring-drum piece 22 preferably provides stage material or supporting structure for over 80% of the stages in the multi-stage rotor 10.

The remaining stage material or blade supporting structure comprises the sub-assembly or "grouped" parts located at the rear of the rotor. As shown in detail in FIG. 3, these latter three major structural pieces—for a total of six—include the 12th stage disk member 24, the rear conical stub shaft 25, and the 13th–14th stage integral disk-spacer member, indicated generally at 26. The latter piece consists of a pair of disk portions 60-62 joined by a thin, integral spacer portion 63. The disk portions include the circumferential dovetail slots 58, as does disk member 24, for retention of the rotor blades 27, in the manner described above. A forward integral spacer portion 66 on piece 26 includes a radial flange 68 having through-holes adapted to be aligned with like holes in disk 24, stub shaft peripheral flange 25a, and a flanged portion 70 of the 12th stage "spacer" portion 56 of the ring-drum 22. This latter construction will be employed primarily in those instances where the temperatures—always higher at the rear of the compressor—become too severe for certain of the modern lightweight, e.g., titanium alloys. This can occur at high supersonic speeds, in which instance steel or other alloys may be utilized for the last few stages. It should be noted that only two bolted flanges are required in the entire 14 stage rotor.

As stated previously, it is important in advanced aircraft engine design to achieve lightweight without sacrifice of safety or reliability, i.e., mechanical integrity. In a drum-type, smooth-spool rotor, therefore, where a thin shell of the proportions of my unique "ring-drum" piece 22 is utilized, it is desirable to insure the necessary rigidity of the "ring-drum" piece. Hence, the invention incorporates a "barrel" or hollow concept provided by joining the thin shell piece 22—at both of the ends thereof—to radial members or "bulkheads" consisting of the disk portion 38 (joined to an elongated forward flanged "spacer" portion 63 of the "ring-drum" shell) and the 12th stage disk member 24. This arrangement insures that should the shell be subjected to undue local radial flexure during rotor operation by reason of one or more blades 27 being lost in one or more rotor stages, the "bulkheads" will provide sufficient rigidity to the ring-drum to compensate or react the resultant unbalancing forces. Also, where spool rubs occur, e.g., at the shrouds or stator vane tips, causing unequal local differential thermal expansion in the shell itself, this will be resisted mechanically by the "barrel" configuration. The 12th stage separated disk configuration also provides a "tie-down" point for the rear stub shaft flange 25. This is important in order to accommodate unequal radial deformations due to both centrifugal force and differential thermal growth between the "ring-drum" and the rear structural members. Excessive meridional bending stresses in the joining shell "spacer" portion are also relieved by use of the "rigidizing" disk members.

Various seals are also provided in the rotor structure to keep the fluid flow through the compressor in the proper channels, i.e., front hub seal 72, rear hub shaft 74, and a compressor discharge rubbing seal 76. The stub shaft hubs may also include splines 77—77 for connection to a gearbox (accessory) power take-off and to the turbine rotor shaft (not shown) respectively.

It will be apparent from the above that my invention provides a light weight rotor construction of the smooth-spool, drum-type having individually removable blades *and* having a minimum number of parts by reason of "grouping" of the major structural parts of the rotor. That is, I have in the disclosed embodiment "grouped": the first stage rotor disk, shroud seal, and spacer (part 18); the second stage disk (rigidizing member) and front stub shaft (part 20); stages 3–11 (in the "ring-drum" piece 22); stage 12 blade supporting and rigidizing member (disk 24); rear heat-resistant 13th–14th stage blade support (part 26); and the rear stub shaft or rotor support (part 25). Most importantly, this has been accomplished in a drum-rotor having removable blades without the typically heavy, reinforced, drum structures heretofore utilized having internal, parallel-sides, integral, machined disks (webs), or an inordinate amount of blade supporting and rotor structural parts insuring costly and time-consuming assembly procedures. Thus, with the arrangement disclosed herein the greatly simplified and flexible assembly procedures, now to be described, may be utilized.

By referring to the exploded view of FIG. 5, it will be seen that the first step in assembling the basic rotor structure of FIG. 1 comprises placing the rear disk-spacer part (where utilized for higher temperature applications) in a vertical position on a suitable base or platform 80. Next, the rear stub shaft 25 is dropped over part 26. Bolts 44, which have been snapped into place on flange 68, the bent portions 48 hooking over the lip of the disk-spacer 68 flange fit into holes in the peripheral shaft flange 25a. Next, the 12th stage blade supporting and drum rigidizing disk member 24 is located on the shaft flange by inserting the threaded bolt ends 45 in smooth holes in the disk member rim portion. Next, the integral ring-drum piece 22, with the blades 27 of stages 3–11 pre-inserted in grooves 58, is lowered vertically onto the rear shaft, with the bolt parts 45 fitting through smooth holes bored in the flange portion 70. With the unique configuration of the "ring-drum" piece, contrary to what has heretofore been impossible, the assembler may *reach inside* the drum all the way to the rear and simply fasten together the parts 22–24–25–26—i.e., "assemble" stages 3–14 to the rotor shaft—by threading a series of nuts 52 on a *single* row of bolts 44. More bolts can now be "snapped" onto a "ring-drum" flange 82 at the forward (upper) end of the "ring-drum" preparatory to placing part 20, consisting of the integral second stage disk and stub shaft part thereon. Piece 18—the first stage disk and integral spacer—is now positioned on the bolts 44 and additional nuts 52 can be put in place to securely fasten together the remaining three parts of the rotor assembly. Thus, a total of only *six* major structural parts are required in constructing a 14th stage rotor and, more precisely, only *two* bolted flange connections are necessary.

It may be desirable to use further means to lighten the weight of the rotor. High strength-to-weight materials are particularly advantageous when used in constructing a rotor in accordance with the design described hereinabove. For example, it has been found that for certain high speed engine applications it will be possible to construct one or more of the major pieces of titanium alloys. The limiting factors include the weight, or more correctly, the density of the material and especially the operating temperatures to which the machine is subjected. However, with use of my novel "ring-drum" piece greater advantage can be taken of the inherent properties of the material. Thus, by means of the unique design of the thin-shelled hollow "ring-drrum" piece 22 superior metallurgical properties may be obtained as a result of its physical and mechanical characteristics. Specifically, during the forging process there is a significant displacement of the material of the raw titanium billet made possible solely by reason of the *lack* of the internally machined, parallel sides, disks or webs of the conventional drum-type rotor construction. In other words, there is no need to leave enough material to permit machining out—of the center of the billet—the half-dozen or more disk members. As pointed out above, increased rigidity—if needed—for very lightweight "ring-drum" can be provided by the two end parts of the "barrel," i.e., disk portion 38 and disk member 24. It should be pointed out that my novel rotor construction embodying the "ring-drum" piece is considerably less subject to thermal growth induced problems, in the presence of extreme heat, than are the conventional drum-type rotors. In other words, compressor rotors with relatively heavy, separate (or integral) internal disks or webs almost universally require provision for increased radial build-up clearances (over those normally required for purely mechanical considerations) to accommodate operating transients. This is because the radially-extending internal disk parts require considerably longer to stabilize, i.e., completely react to sudden changes in temperature due to sudden acceleration (or deceleration) of the engine, than do the blades, spacers and disk rim areas. Further, the disk bores in the area of the rotor hub run significantly hotter due to stratification of air as the colder, denser air is centrifuged outwardly. Thus, use of disks inherently creates a need for either the addition of strengthening material at the disk hub—which increases weight unduly—or provision for an internal cooling system, the latter involving increased cost and design complexity. Finally, the unique "ring-drum'" configuration inherently accomplishes a further advantage, i.e., the thin shell is able to follow the flow-path gas temperature much more closely than the conventional heavy fabricated or solid drum-type rotor with disks. Thus, reduced radial clearances between the rotor blade tips and the stator casing may be provided, which further enhances the aerodynamic performance, and therefore the efficiency of the compressor.

Other obvious modifications and changes to the embodiments disclosed herein as will occur to those skilled in the art are naturally intended to be covered by the claims appended hereto.

What is claimed is:

1. In an axial-flow, multi-stage bladed rotor:
 a forward integral rotor and blade supporting member having a conical stub shaft portion and at least one annular front disk portion, said front disk portion extending radially inwardly and outwardly of the juncture of the disk and shaft portions and having an enlarged rim section including a plurality of axial dovetail grooves therein adapted to receive blades of one of said stages;
 at least one annular disk member having an enlarged rim portion including a circumferential dovetail groove therein adapted to receive bladed members of another of said rotor stages;
 a frusto-conical hollow ring-drum piece comprised of a relatively thin shell having an outer surface and an inner surface, a plurality of circumferential, axially-spaced dovetail grooves in said outer surface, and a plurality of integral narrow ring portions of truncated generally triangular shape in cross-section projecting from said inner surface, there being a ring portion at the location of each groove, wherein the inner diameter of said shell at said truncated ring portions is slightly less than the diameter at the bottom of said grooves; and
 a rear conical stub shaft member having a peripheral flange at its greatest diameter;
 fastening means connecting said forward integral rotor and blade supporting member to said ring-drum piece adjacent one end thereof and said rear stub shaft flange to said ring-drum piece adjacent the other end thereof, said forward disk portion and said annular disk member providing increased rigidity to said ring-drum piece shell, wherein the circumferential, dovetail grooves retain at least 80% of the stages of said multi-stage rotor.

2. An axial-flow, multi-stage rotor of substantially smooth spool configuration, said rotor comprising:

- a plurality of bladed members comprising the stages in said rotor;
- a frusto-conical hollow ring-drum piece comprised of a relatively thin shell having an outer surface and an inner surface, a plurality of circumferential, axially-spaced dovetail grooves in said outer surface, and a plurality of integral narrow ring portions of truncated generally triangular shape in cross-section projecting from said inner surface, there being a ring portion at the location of each groove, wherein the inner diameter of said shell at said truncated ring portions is slightly less than the diameter at the bottom of said grooves;
- a rear annular blade-supporting disk member;
- a rear conical stub-shaft member rotatably supporting said rotor, said member being connected to said disk member;
- a forward integral rotor and blade supporting member having a conical stub shaft portion and at least one annular front disk portion, said front disk portion extending radially inwardly and outwardly of the juncture of the disk and shaft portions and having an enlarged rim section including a plurality of axial dovetail grooves therein adapted to receive blades of one of said stages; and
- fastening means connecting said forward integral rotor and blade supporting member to said ring-drum piece adjacent the front end thereof and said rear stub shaft and rear annular disk member adjacent the rear end thereof, said disk portion and annular member providing increased rigidity to said ring-drum piece shell, said fastening means including means permitting pre-assembly of said rear stub shaft and said annular member to facilitate assembly with said ring-drum piece, the circumferential, dovetail grooves retaining at least 80% of the stages of said multi-stage rotor.

3. An axial-flow, multi-stage rotor of substantially smooth spool configuration, said rotor comprising:

- a plurality of bladed members comprising the stages in said rotor;
- a first frusto-conical hollow ring-drum piece comprised of a relatively thin shell having an outer surface and an inner surface, a plurality of circumferential, axially-spaced dovetail grooves in said outer surface, and a plurality of integral narrow ring portions of truncated generally triangular shape in cross-section projecting from said inner surface, there being a ring portion at the location of each groove, wherein the inner diameter of said shell at said truncated ring portions is slightly less than the diameter at the bottom of said grooves of said rear stub shaft and said annular member to facilitate assembly with said ring-drum piece, the circumferential, dovetail grooves retaining at least 80% of the stages of said multi-stage rotor;
- a rear annular blade-supporting disk member;
- a rear conical stub-shaft member rotatably supporting said rotor, said member being connected to said disk member;
- a disk-spacer member, said member including a pair of annular portions separated by thin, integral spacer portions and having a circumferential blade groove therein, said disk-spacer member including a peripheral flange at the forward edge thereof, said rear conical stub-shaft projecting through holes in said annular portion;
- a forward integral rotor and blade supporting member having a conical stub-shaft portion and at least one annular front disk portion, said front disk portion extending radially inwardly and outwardly of the juncture of the disk and shaft portions and having an enlarged rim section including a plurality of axial dovetail grooves therein adapted to receive blades of one of said stages; and
- fastening means connecting said forward integral rotor and blade supporting member to said ring-drum piece adjacent the front end thereof and said rear conical stub-shaft, rear annular disk member, and said disk-spacer member adjacent the rear end thereof, said disk portion and annual member providing increased rigidity to said ring-drum piece shell, said fastening means including means permitting pre-assembly of said rear stub-shaft, said disk-spacer and said annular member to facilitate assembly with said ring-drum piece comprising hook portions engaging said disk-spacer peripheral flange so as to retain said fastening means in holes in said rear stub-shaft flange.

References Cited by the Examiner

UNITED STATES PATENTS

| | | | |
|---|---|---|---|
| 3,010,643 | 11/1961 | Ricketts | 253—39 |
| 3,085,400 | 5/1963 | Sonder et al. | 253—39.15 |
| 3,154,243 | 10/1964 | Koff | 253—39 |

FOREIGN PATENTS

| | | |
|---|---|---|
| 464,366 | 1/1951 | Italy. |
| 489,062 | 1/1956 | Italy. |

MARK NEWMAN, *Primary Examiner.*

HENRY F. RADUAZO, *Examiner.*